United States Patent
Lambert

(10) Patent No.: US 6,169,835 B1
(45) Date of Patent: Jan. 2, 2001

(54) OPTICAL FIBER CABLE WITH LATERAL LIGHT DIFFUSION

(75) Inventor: Emmanuel Lambert, Tigy (FR)

(73) Assignee: U.S. Philips Corporation, New York, NY (US)

( * ) Notice: Under 35 U.S.C. 154(b), the term of this patent shall be extended for 0 days.

(21) Appl. No.: 09/255,629

(22) Filed: Feb. 22, 1999

(30) Foreign Application Priority Data

Feb. 25, 1998 (FR) .................................................. 98 02283

(51) Int. Cl.⁷ ...................................................... G02B 6/44
(52) U.S. Cl. .......................... 385/104; 385/102; 385/107
(58) Field of Search .................................. 385/100, 102, 385/103, 104, 106, 107, 111, 113, 115

(56) References Cited

U.S. PATENT DOCUMENTS

| | | | |
|---|---|---|---|
| 4,331,379 | * 5/1982 | Oestreich et al. | ................... 385/104 |
| 4,676,590 | * 6/1987 | Priaroggia | ............................. 385/104 |
| 5,333,228 | 7/1994 | Kingstone | ............................. 385/100 |
| 5,416,875 | 5/1995 | Keplinger et al. | .................... 385/102 |
| 5,715,879 | * 2/1998 | Grahma et al. | ....................... 385/103 |
| 5,978,536 | * 11/1999 | Brandi et al. | ......................... 385/102 |

FOREIGN PATENT DOCUMENTS

WO9000699   1/1990   (JP) .................................. F21V/8/00

* cited by examiner

Primary Examiner—Frank G. Font
Assistant Examiner—Sang H. Nguyen
(74) Attorney, Agent, or Firm—F. Brice Faller

(57) ABSTRACT

An inner layer of strands comprises at least one strand; each strand consists of three or four twisted elementary fibers without any central elementary fiber. The ratio of the twist pitch of the strand to its diameter is between 7 and 19. The inner layer may be surrounded by an outer layer which also comprises twisted strands.

7 Claims, 2 Drawing Sheets

OPTICAL FIBER CABLE WITH LATERAL LIGHT DIFFUSION

BACKGROUND OF THE INVENTION

The invention relates to an optical fiber cable with lateral light diffusion, comprising at least one strand consisting of a first layer of elementary fibers around which other layers of elementary fibers may be twisted.

Such a cable is used for decorative lighting, with which luminous lines which can follow curved paths can be drawn.

The document U.S. Pat. No. 5,416,875 (John S. Keplinger et al.) describes a cable which comprises several strands, referred to as "single cables". Each strand comprises a plurality of individual fibers, for example, four rectilinear central fibers which constitute a central core around which other fibers are twisted in a continuous manner. The strands are twisted themselves.

SUMMARY OF THE INVENTION

It is an object of the invention to simplify the implementation of the cable by improving its characteristics.

To this end, the elementary fibers of the first layer of a strand are twisted themselves, and this first layer comprises a number of elementary fibers such that there is no central elementary fiber in the strand.

Strands of two, three or four fibers do not have a central fiber, which is advantageous because a central fiber would not be twisted and would thus emit little lateral light and, moreover, even if it emitted a surplus of light, this light would be absorbed by the fibers surrounding it.

When a strand comprises a first layer of fibers covered by a second layer of fibers and when the fibers constituting the first layer are twisted in a given ratio between the helical pitch and the diameter of the layer, the fibers constituting the second layer are twisted in a ratio between the helical pitch and the diameter of the second layer that is different from the above-mentioned given ratio, such that the radius of curvature due to the twisting is substantially the same for all fibers.

BRIEF DESCRIPTION OF THE INVENTION

DETAILED DESCRIPTION OF THE PREFERRED EMBODIMENTS

Figure 1:
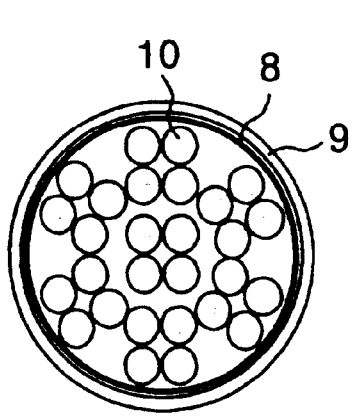
FIGS. 1A and 1B are sectional views of two embodiments of a cable.
Figure 1:
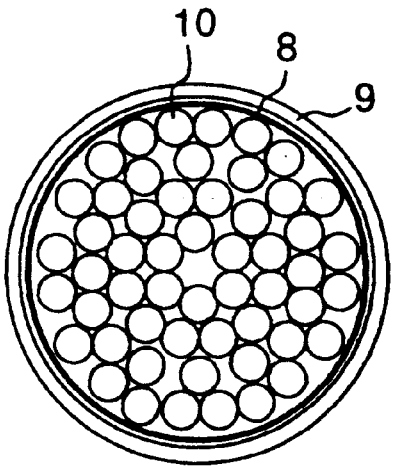

The optical fiber cable with lateral light diffusion shown in FIG. 1A comprises seven identical strands, a central strand which is surrounded by six others, one of which is denoted by the reference numeral 10; each strand consists of four elementary fibers helically twisted and denoted by a square adjoining the centers of the four fibers of each strand. The cable shown in FIG. 1B comprises 18 strands, each of which consists of three elementary fibers helically twisted and denoted by a triangle adjoining the centers of the three fibers of each strand; there is no central strand.

It will be evident that a strand of two fibers (not shown) comprises two fibers side by side.

Figure 2:
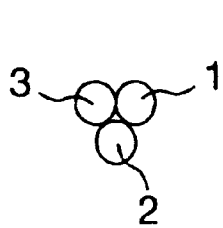
FIGS. 2A and 2B are sectional and side views of a strand of three fibers.
Figure 2:
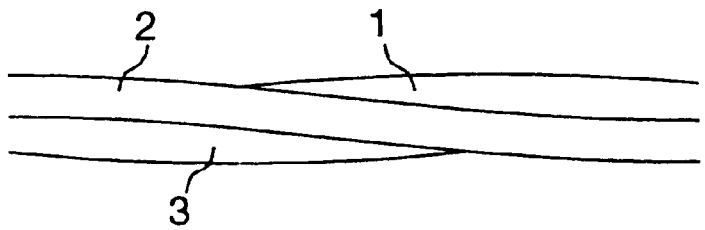

A strand of three fibers, shown in FIG. 2, is constituted by fibers 1 to 3 which are twisted so as to constitute the strand.

Figure 3:
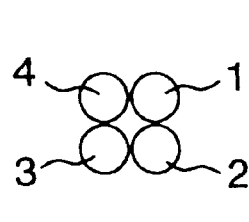
FIGS. 3A and 3B are sectional and side views of a strand of four fibers.
Figure 3:
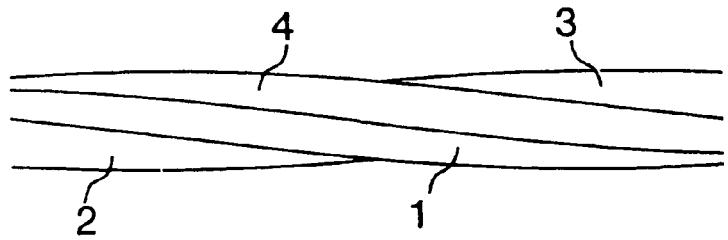

A strand of four fibers, shown in FIG. 3, is constituted by fibers 1 to 4 which are twisted so as to constitute the strand. In these cases, each fiber has a nominal diameter of 1 mm; in other variants, this diameter maY also be 0.75 mm. The fibers are made of PMMA (polymethyl methacrylate) having a refractive index of 1,492: for example, the models "PG" of the firM "Toray" may be used.

The strands are surrounded by a flexible transparent foil 8 of "Mylar" and the whole is in its turn surrounded by a transparent tubular sheath 9 of "PVC" (polyvinyl chloride) having a thickness of between 0.7 and 1.2 mm. When each of the seven strands of FIG. 1A comprises four fibers of 1 mm, the cable obtained has a nominal diameter of approximately 8.6 mm.

In all the above-mentioned cases where one strand consists of a single layer of fibers, the ratio between the helical twist pitch and the diameter of a strand is preferably between 7 and 19, and even between 10 and 16.

Figure 4:
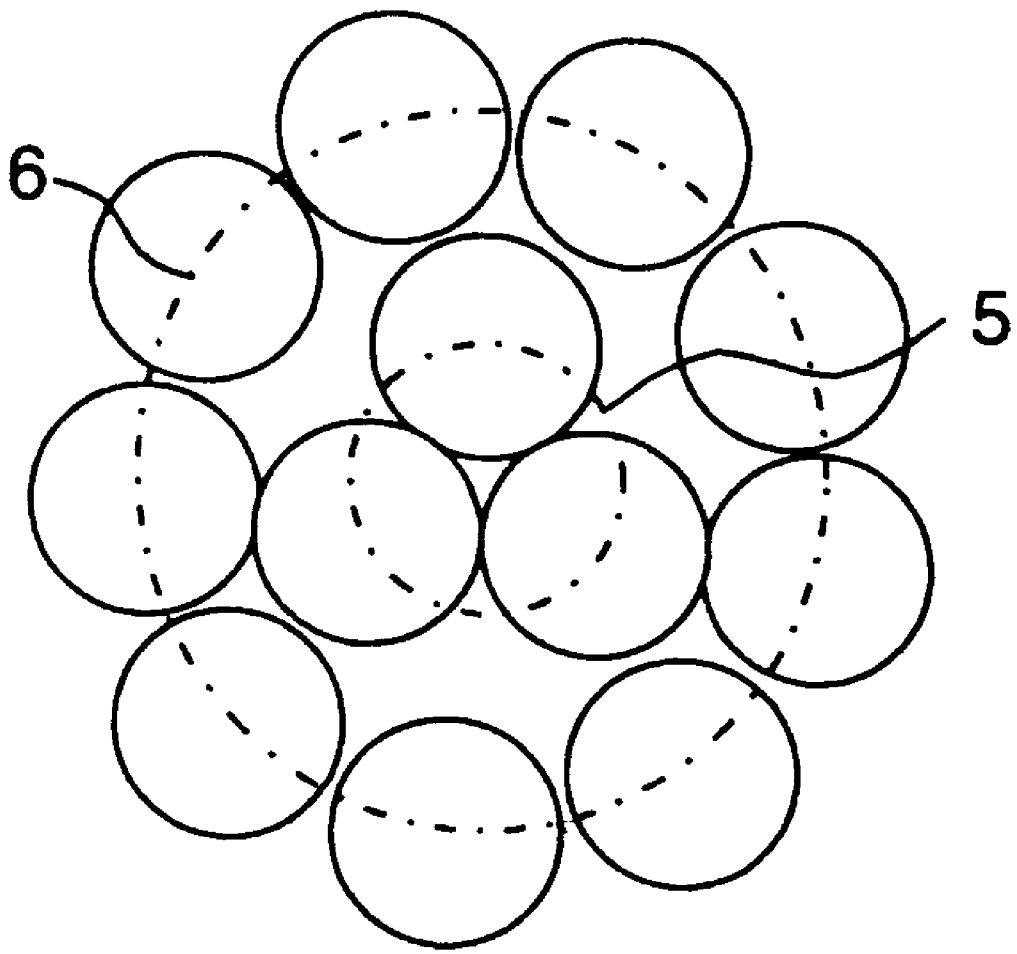
FIG. 4 is a sectional view of a strand consisting of a first layer of three fibers and a second layer of nine fibers.

FIG. 4 shows a more complicated strand in which a first layer of three fibers, indicated by a circle 5, is covered by a second layer of nine fibers, indicated by a circle 6. If the fibers constituting the two layers are twisted with substantially the same twist pitch, the external fibers are less constrained than the internal fibers and emit less light; this is due to a larger radius of curvature which reduces the flexion applied to the fibers of the second layer. To render the emission of light of all fibers as equal as possible, the ratio between the helical pitch and the diameter of the layer, used for twisting the second layer, is different from that used for twisting the first layer. The radius of curvature due to the twisting is thus substantially the same for all fibers.

It is also possible to solve the problem by using different types of fibers for different layers. Several means are possible for obtaining different types of fibers, for example, by choosing different fiber diameters or different surface treatments: the suitable types may be determined easily by way of systematic trials. This allows manufacture of a strand in a single operation, while maintaining an equal emission for all layers.

What is claimed is:

1. An optical fiber cable having a lateral light diffusion, comprising at least one strand consisting of a first layer of elementary fibers around which other layers of elementary fibers are twisted, wherein the elementary fibers of the first layer are twisted, and said first layer comprises a number of elementary fibers such that there is no central elementary fiber in the strand, wherein the fibers of the first layer are twisted in a ratio between a helical pitch and a diameter of the first layer ranging between 7 and 19.

2. The optical cable as claimed in claim 1, wherein the fibers are twisted in a ratio between the helical pitch and the diameter of the first layer ranging between 10 and 16.

3. The optical cable as claimed in claim 1, wherein the cable comprises seven identical strands, a central one of said seven identical strands being surrounded by six of said seven identical strands.

4. The optical cable as claimed in claim 3, wherein the seven strands comprise four fibers each.

5. The optical cable as claimed in claim 1, wherein said first layer is covered by a second layer of fibers, and wherein the fibers constituting the second layer are of a type which is different from the fibers of the first layer.

6. The optical cable as claimed in claim 1, further comprising a flexible transparent foil which surrounds said cable, and a transparent tubular sheath which surrounds said foil.

7. An optical fiber cable having a lateral light diffusion, comprising at least one strand consisting of a first layer of elementary fibers around which other layers of elementary fibers are twisted, wherein the elementary fibers of the first layer are twisted, and said first layer comprises a number of elementary fibers such that there is no central elementary fiber in the strand, wherein the fibers constituting the first layer are twisted in a given ratio between a helical pitch and a diameter of the layer, and wherein the fibers constituting a second layer of said other layers are twisted in a ratio between the helical pitch and a diameter of the second layer that is different from said given ratio, such that a radius of curvature due to the twisting is substantially the same for all fibers.

\* \* \* \* \*